United States Patent [19]

Bales

[11] Patent Number: 5,781,854
[45] Date of Patent: Jul. 14, 1998

[54] MULTIPLE WIRELESS SWITCHING UNITS EMBEDDED IN A SWITCHING SYSTEM

[75] Inventor: Bruce Merrill Bales, Louisville, Colo.

[73] Assignee: Lucent Technologies Inc., Murray Hill, N.J.

[21] Appl. No.: 571,570

[22] Filed: Dec. 13, 1995

[51] Int. Cl.⁶ ............................................. H09Q 7/20
[52] U.S. Cl. ................... 455/403; 455/414; 455/560; 455/426; 455/461
[58] Field of Search ....................... 455/403, 422, 455/426, 436, 445, 560, 414, 461, 435; 379/207, 211, 67

[56] References Cited

U.S. PATENT DOCUMENTS

| | | | |
|---|---|---|---|
| 5,311,576 | 5/1994 | Brunson et al. | 379/89 |
| 5,325,419 | 6/1994 | Connolly et al. | 455/461 |
| 5,329,578 | 7/1994 | Brennan et al. | 455/414 |
| 5,329,579 | 7/1994 | Brunson | 379/88 |
| 5,353,331 | 10/1994 | Emery et al. | 455/461 |

*Primary Examiner*—Dwayne D. Bost
*Assistant Examiner*—Keith Ferguson
*Attorney, Agent, or Firm*—John C. Moran

[57] ABSTRACT

Embedding one or a plurality of wireless switches into a switching system. The wireless switches are both physically and logically integrated into the switching system. The switching system performs the complex switching operations. Physically, each wireless switch emulates link interfaces in its connections to the switching system's communications control and data media. Logically, each of the wireless switch units communicates with a control processor controlling the operations of the switching system as if each of the wireless switches was a set of individual station sets. Each wireless switch is assigned a set of wireless sets. Each of the wireless sets has a unique telephone number which the control processor of the switching system identifies with a physical position on the communication media. Upon receipt of an incoming call for a particular wireless set, the control processor directs the voice and control information of the call to the wireless switch that is emulating what the control processor believes is a station set attached to the switching system. If the wireless set is registered on a base station attached to the assigned wireless switch, then the call is completed via the assigned wireless switch and the base station with the wireless switch directly handling the communication between the wireless set and the control processor. If the wireless set is registered on a base station connected to another wireless switch other than the assigned wireless switch, the assigned wireless switch receives the call control information from the control processor communicates this information to the other wireless switch. The assigned wireless switch then continues to relay all control information being exchanged between the control processor and the other wireless switch.

16 Claims, 8 Drawing Sheets

| TELEPHONE NUMBER (404) | ACTIVE PCS SWITCH (406) | HAND OFF FROM PCS SWITCH (407) | CALL STATE (408) | TIME SLOT INFORMATION (409) |
|---|---|---|---|---|
| ROW 401 | | | | |
| ROW 402 | | | | |
| ⋮ | ⋮ | ⋮ | ⋮ | ⋮ |
| ROW 403 | | | | |

FIG. 5

| TELEPHONE NUMBER (503) | ASSIGNED PCS SWITCH (504) |
|---|---|
| ROW 501 | |
| ⋮ | ⋮ |
| ROW 502 | |

MULTIPLE WIRELESS SWITCHING UNITS EMBEDDED IN A SWITCHING SYSTEM

TECHNICAL FIELD

This invention relates to personal communication service systems, and, in particular, to embedding a personal communication system in a telecommunications switching system.

BACKGROUND OF THE INVENTION

Within the prior art, it is known to connect a personal communication service (PCS) system (also referred to as a wireless system) to a central office (also referred to as a local exchange) or to a business telecommunications switching system (also referred to as a PBX) using what is referred to as a line appearance connection. In a line appearance connection, each wireless set that can connect to the PCS system has an unique telephone number and telephone link on the switching system. The PCS system terminates each of these telephone links and is responsive to a call being received on a telephone link to connect that call to the wireless set assigned to that telephone link. When a wireless set originates a telephone call, the PCS system originates a call to the switching system on the telephone link assigned to the originating wireless set. The principal advantage of the line appearance connection method is that all telephone features are provided by the existing commercial switching system. In addition, the switching system provides the necessary billing and recording of telephone charges associated with calls originated by the wireless set.

The line appearance connection method does however suffer from a number of problems. For a small number of wireless sets, the line appearance connection method suffers from the problem of requiring a separate PCS system having a physical enclosure, power supplies, etc. Consequently, for a small number of wireless sets, the line appearance connection method is relatively expensive. In addition, as the number of wireless sets grow, it is necessary to increase the switching capabilities of the PCS system so that an active wireless set can be connected to its dedicated telephone link via the PCS system. This requires the PCS system to have a high capacity network for switching voice and data. Also, the line appearance connection method requires a link interface at the switching system side of a link and a link interface at the PCS system side of the link for each wireless handset. The result is that a large amount of money is devoted to the link interfaces both on the switching system and on the PCS system.

What is needed then is an economical way of growing a PCS system utilizing the line appearance connection method from a small number of wireless sets to a large number of wireless sets.

SUMMARY OF THE INVENTION

The foregoing problems are solved, and a technical advance in the art is achieved by embedding one or a plurality of PCS switches into a switching system. The PCS switches are both physically and logically integrated into the switching system. Advantageously, the switching system performs the complex switching operations. Physically, each PCS switch emulates link interfaces in its connections to the switching system's communications control and data media. Logically, each of the PCS switch units communicates with a control processor controlling the operations of the switching system as if each of the PCS switches was a set of individual station sets. Each PCS switch is assigned a set of wireless sets. Each of the wireless sets has a unique telephone number which the control processor of the switching system identifies with a physical position on the communication media.

Upon receipt of an incoming call for a particular wireless set, the control processor directs the voice and control information of the call to the PCS switch that is emulating what the control processor believes is a station set attached to the switching system. If the wireless set is registered on a base station attached to the assigned PCS switch, then the call is completed via the assigned PCS switch and the base station with the PCS switch directly handling the communication between the wireless set and the control processor. In addition, the PCS switch provides an internal network for connecting the audio portion of the call between the base station and the communication media of the switching network of the switching system. If the wireless set is registered on a base station connected to another PCS switch other than the assigned PCS switch, the assigned PCS switch receives the call control information from the control processor communicates this information to the other PCS switch. The assigned PCS switch then continues to relay all control information being exchanged between the control processor and the other PCS switch. The assigned PCS switch transmits to the other PCS switch the network connection information for the voice portion or circuit switch data portion of the call. The other PCS switch is responsive to this network connection information to connect the wireless set via the base station into the switching network of the switching system. Similar operations are performed when a wireless set originates a call.

As additional wireless sets are added to the system, additional PCS switches are inserted into the switching system. Since the PCS switches communicate control information among themselves over the switching system's communication medium, the intercommunication between PCS switches is physically provided. In addition, the switching of voice or circuit data is performed by the switching network of the switching system, and no additional switching capabilities are required of the PCS switches as the number of wireless sets increases. For a small number of wireless sets, only one PCS switch needs to be inserted into the switching system; hence, there is no requirement of an additional physical enclosure, power supplies, etc. This means that the invention allows the number of wireless sets to grow from a small number up to a very large number in an economical manner.

These and other advantages and features of the invention will become apparent from the following description of the illustrative embodiments of the invention taken together with the drawing.

DETAILED DESCRIPTION

Figure 1:
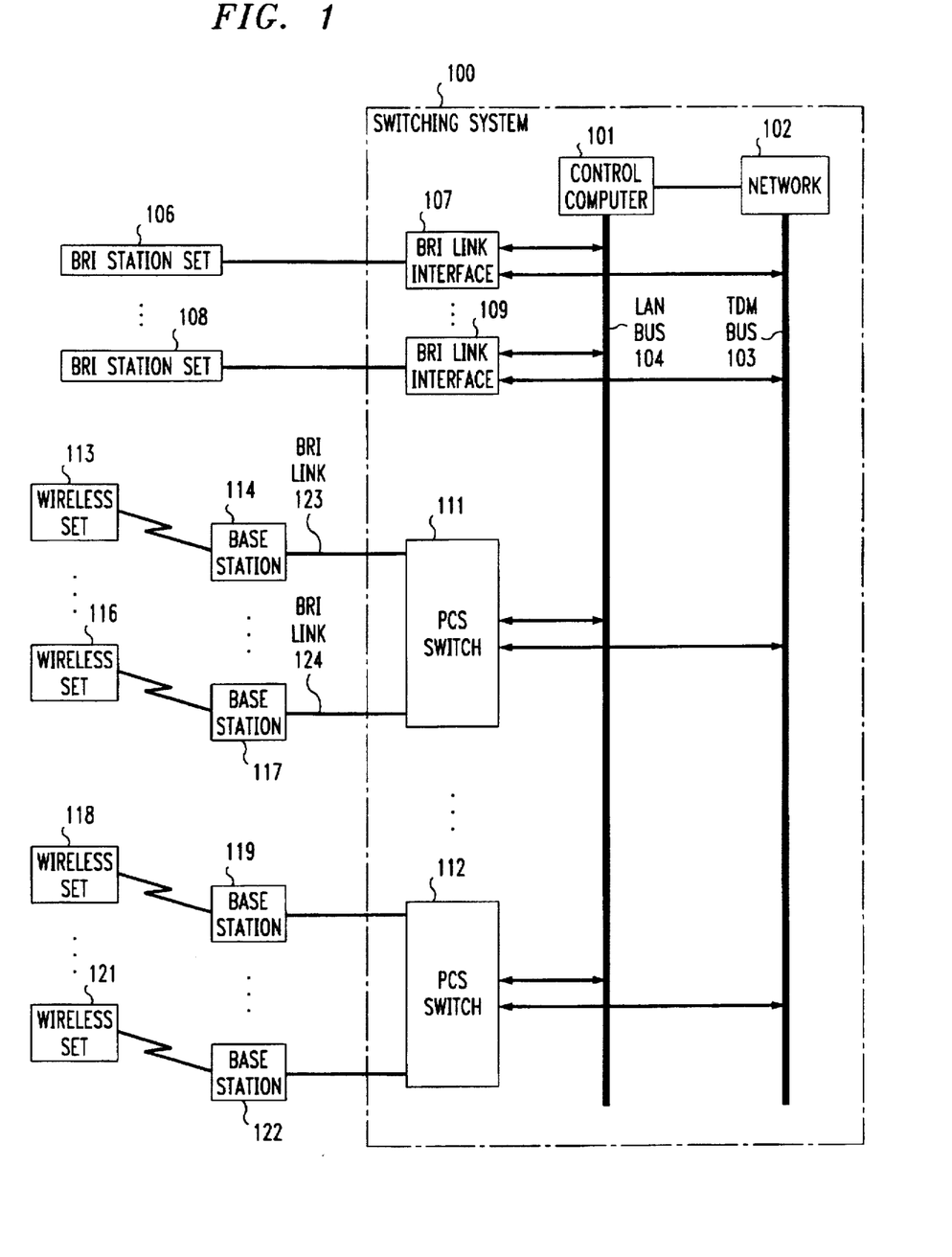
FIG. 1 illustrates, in block diagram form, an embodiment of the invention.

FIG. 1 illustrates a first embodiment of the invention. Switching system 100 may be a central office or a business telecommunications switching system. Advantageously, switching system 100 is the Definity® Business Telecommunications Switching System manufactured by AT&T. Switching system 100 comprises control computer 101 which provides the overall call control, administration, and maintenance operations of switching system 100. Network 102 has a plurality of TDM buses such as TDM bus 103 terminating on it. However, FIG. 1 only shows TDM bus 103. Control computer 101 transmits and receives information on LAN bus 104. Switching system 100 is physically constructed using printed circuit card carriers or racks. Physically inserted into these printed circuit card carriers are printed circuit cards with BRI link interfaces 107 through 109 and PCS switches 111 through 112 as well as control computer 101 and network 102. Each PCS switch is mounted on a single printed circuit card. There are 12 BRI interfaces on each printed circuit card. Using administrative tables internally stored, control computer 101 associates a BRI station set with a particular BRI link interface that is assigned to a physical location within a carrier. For example, if an external call is received for BRI station set 106, control computer 101 is responsive to this incoming call to transmits a set up message via LAN bus 104 to BRI link interface 107 which relays the message to BRI station set 106. Once the user of BRI station set 106 answers the call, BRI station set 106 transmits a connection message via BRI link interface 107 and LAN bus 104 to control computer 101. Control computer 101 responds with a connection acknowledge message transmitted via LAN bus 104 to BRI link 107. The connection acknowledge message specifies which of the two B channels of the BRI link interconnecting BRI link interface 107 and BRI station set 106 is to be used. In addition, control computer 101 transmits via a control channel on TDM bus 103 the timeslot information which specifies to BRI link interface 107 the timeslot that it is to receive and transmit audio or circuit data on TDM bus 103. TDM bus 103 is a dual 256 timeslot parallel bus (for a total of 512 timeslot). The control channel is implemented in the first five timeslots of every frame on TDM bus 103. BRI link interface 107 is responsive to the timeslot information to transmit and receive on the specified timeslot. The incoming call was received on another TDM bus which was interconnected through network 102 to TDM bus 103 by control computer 101. Switching system 100 can support a variety of trunks such as primary rate interface (PRI) links or analog lines.

To understand the operation of a PCS switch, consider the following example. Assume that the telephone number utilized by wireless set 113 is assigned by control computer 101 to a virtual BRI link interface emulated by PCS switch 111. When BRI station set 107 originates a call to wireless set 113, control computer 101 is responsive to the set up message received from BRI station set 106 that specifies the destination telephone number to route the setup message via LAN bus 104 to PCS switch 111. If wireless set 113 is registered via base station 114 on PCS switch 111, PCS switch 111 routes the setup message in a format acceptable by a wireless set to wireless set 113. When the user of wireless set 113 answers the call from BRI station set 106, wireless set 113 transmits a connect message to PCS switch 111 via base station 114 and BRI link 123. PCS switch 111 transmits this connect message to control computer 101. Control computer 101 relays the setup message to BRI station set 106 via LAN bus 104 and BRI link interface 107. The connect message specifies to BRI link interface 107 the B channel that is to be utilized for communicating the voice information to and from BRI station set 106. In addition, control computer 101 transmits via the control channel on TDM bus 103 the timeslots that are to be utilized by BRI link interface 107 to receive audio information or transmit audio information on TDM bus 103. Further in response to the connection message from wireless set 113, control computer 101 transmits back a connection acknowledge message to PCS switch 111. Also, control computer 101 transmits the receive and transmits timeslot to PCS switch 111 via the control channel of TDM bus 103. PCS switch 111 utilizes this control information to establish a talk path from wireless set 113 to TDM bus 103 via base station 114, BRI link 123, and PCS switch 111.

Consider now an extension of this example. Assume that wireless set 113 registers on base station 119. Each PCS switch has an assignment table which defines the telephone numbers of wireless sets with respect to the assignment of these telephone numbers to individual PCS switches. FIG. 5 illustrates such an assignment table. When wireless set 113 registers on base station 119, PCS switch 112 looks up in its assignment table and determines that wireless set 113 is assigned to PCS switch 111. PCS switch 112 transmits a message via LAN bus 104 to PCS switch 111 indicating that wireless set 113 is now registered on PCS switch 112. If BRI station set 106 now places a call to wireless set 113 by transmission of a setup message, control computer 101 is responsive to the setup message to route this message to PCS switch 111. PCS switch 111 determines from its active table (FIG. 4) that station set 113 is now registered on PCS switch 112. PCS switch 111 then relays the setup message to PCS switch 112 via LAN bus 104. PCS switch 112 is responsive to this relay setup message to transmit a setup message to wireless set 113 via base station 119. When the user of wireless set 113 answers the call, wireless set 113 transmits a connect message to PCS switch 112 via base station 119. PCS switch 112 is responsive to this connect message to transmit the connect message to PCS switch 111 which relays the connect message to control computer 101. Control computer 101 responds to the connect message of PCS switch 111 with a connect acknowledge. Upon receipt of connect acknowledge from control computer 101, PCS switch 111 relays this connect acknowledge message to PCS switch 112. Control computer 101 also transmits the receive and transmit timeslot numbers via the control channel of TDM bus 103 to PCS switch 111. Upon receiving the timeslot information, PCS switch transmits this information to PCS switch 112. PCS switch 112 is responsive to the receive and transmit timeslot numbers to establish a connection between wireless set 118 and TDM bus 103.

Consider now a further extension of the previous example where wireless set 113 is engaged in an active call via base station 114 and PCS switch 111. Wireless set 113 physically moves and starts communicating with base station 119. Wireless set 113 initiates a hand-off procedure by transmitting a setup message to PCS switch 112. Advantageously, other wireless protocols may also be used. The setup message specifies that a hand-off is occurring. PCS switch 112 examines its assignment table and determines that the telephone number of wireless set 113 is assigned to PCS switch 111. Based on this information, PCS switch 112 transmits a message to PCS switch 111 informing it that wireless set 113 has performed a hand-off operation to PCS switch 112. PCS switch 111 then transmits back the receive and transmit timeslot numbers to PCS switch 112. PCS switch 112 utilizes this timeslot information to establish a talk path between wireless set 113 and TDM bus 103 via base station 119. PCS switch 111 records that wireless set 113 is now active on PCS switch 112 and transfers all control messages received from control computer 101 to PCS switch 112. If wireless set 113 had been registered on another PCS switch other than PCS switches 111 and 112 before registering on PCS 112, PCS switch 111 would inform the other PCS switch of the registration on PCS switch 112.

Figure 2:
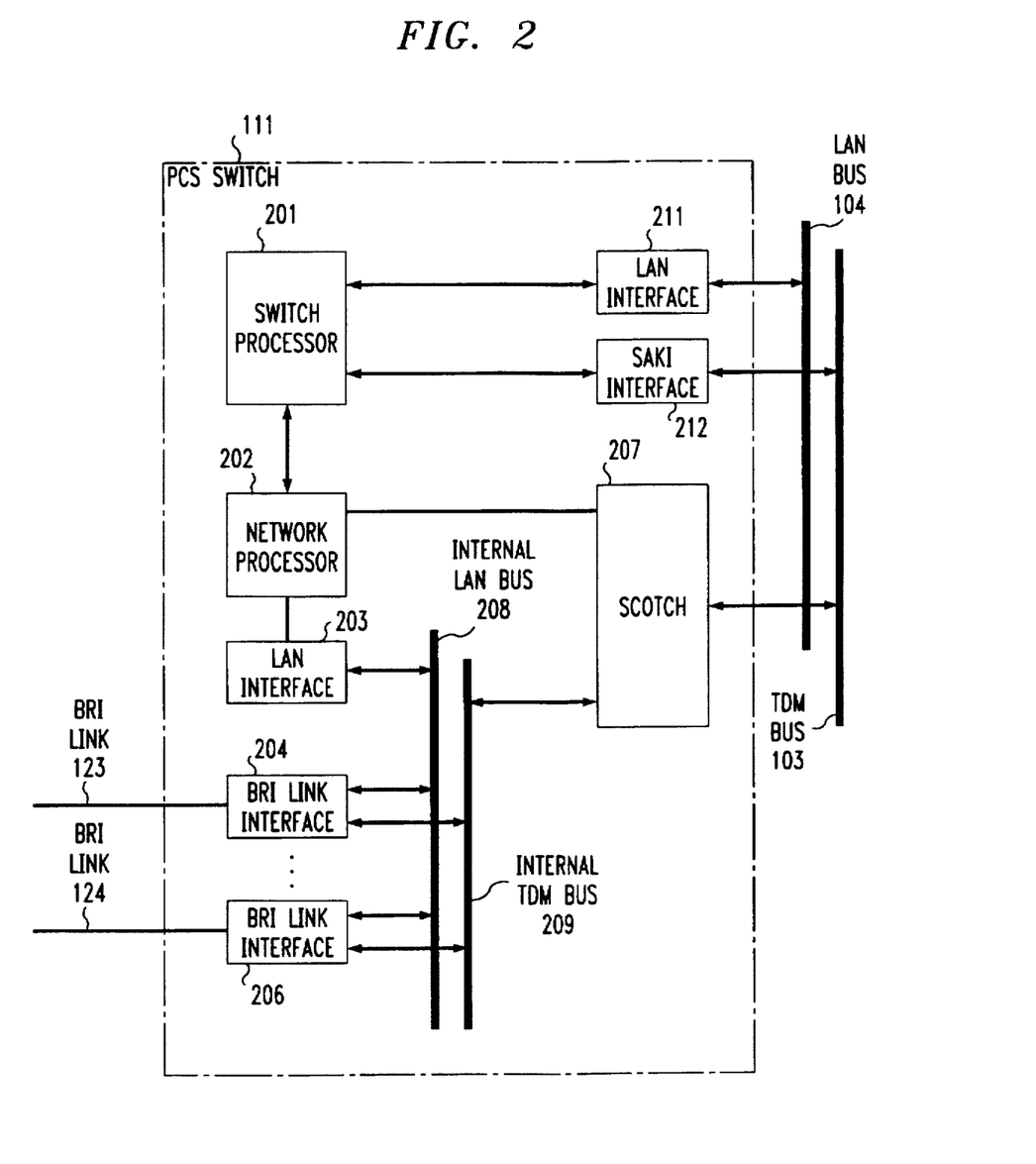
FIG. 2 illustrates, in block diagram form, the internal structure of a PCS switch.

FIG. 2 illustrates PCS switch 111 in greater detail. Switch processor 201 provides overall control of PCS switch 111. PCS switch 111 has an internal switching network comprising internal LAN bus 208 internal TDM bus 209, and SCOTCH circuit 207. This internal network is controlled by network processor 202. Network processor 202 transmits timeslot information to BRI link interfaces 204 through 206 via internal LAN bus 208. SCOTCH circuit 207 is controlled via cable 213. Network processor 202 controls the internal operation of the internal network and communicates messages between switch processor 201 and BRI link interface 204 through 206. Network processor 202 receives and transmits information via LAN interface 203. Switch processor 201 communicates and receives messages from LAN bus 104 and TDM bus 103 via LAN interface 211 and "sanity and control interface" (SAKI) 212. SCOTCH circuit 207 is a switch conferencer and concentration and concentration handler that controls communication of voice and circuit switch data between internal TDM bus 209 and TDM bus 103. Details of the LAN interfaces, SAKI interface, and SCOTCH circuit are given in U.S. Pat. Nos. 3,311,576 and 5,329,579. Those patents are hereby incorporated by reference. SAKI interface 212 is utilized by switch processor 201 to receive and transmit on the control channel of TDM bus 103.

Advantageously, PCS switch 111 can emulate 24 BRI station sets; hence, there can be 24 telephone numbers of wireless sets assigned to PCS switch 111. Further, PCS switch 111 advantageously can have 12 BRI link interfaces. One skilled in the art could readily see that the number of assigned wireless set telephone numbers and BRI link interfaces could be increased or decreased.

Consider the previous example where wireless set 113 was registered on PCS switch 111 via base station 114. Base station 114 is interconnected to PCS switch 111 via BRI link 123 that is terminated on BRI link interface 204. When switch processor 201 receives the setup message indicating an incoming call from LAN bus 104 via LAN interface 211, switch processor 201 first ascertains if wireless set 113 is registered on any of the base stations 114 through 117 attached to PCS switch 111. Since wireless set 113 is registered on base station 114, switch processor transmits the setup message to wireless set 113 via network processor 202, LAN interface 203, internal LAN bus 208, and BRI link interface 204. When a connect message is received back from wireless set 113, switch processor 201 transfers this connect message to control computer 101 via LAN interface 211 and LAN bus 104. The connect acknowledge message received from control computer 101 is routed to wireless set 113 via the same path as detailed for the setup message. When control computer 101 transmits the receive and transmit timeslot numbers via the control channel of TDM bus 103, SAKI interface 212 receives this information and transfers it to switch processor 201. Switch processor 201 is responsive to the timeslot information to control network processor 202 to enable SCOTCH circuit 207 via cable 213 to establish a path between internal TDM bus 209 and TDM bus 103. Network processor 202 also instructs BRI link interface 204 of the timeslots that are to be utilized for information being communicated to and from wireless set 113 by transmission of a message on internal LAN bus 208 via LAN interface 203. Although BRI links have been utilized to connect the base stations to individual PCS switches, one skilled in the art could readily see that these links could be PRI links or links utilizing another protocol.

Figure 3:
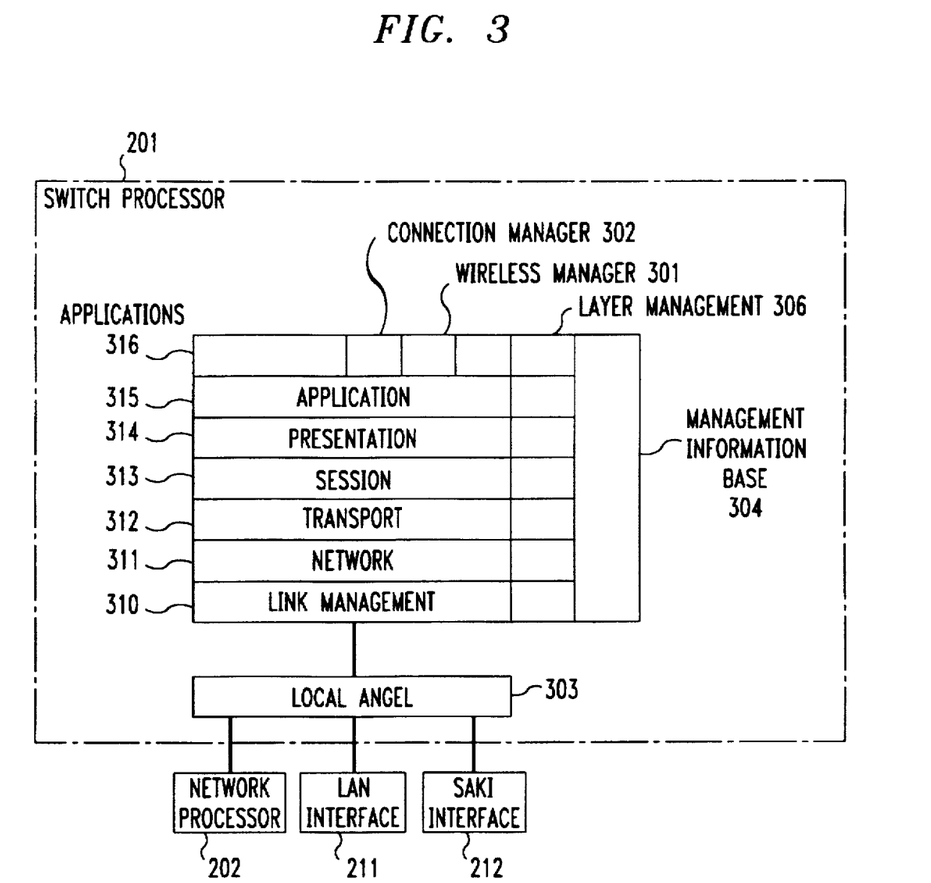
FIG. 3 illustrates, in block diagram form, the software structure of a switch processor of a PCS switch.

FIG. 3 illustrates the software architecture of switch processor 201 of FIG. 2. The architecture illustrated in FIG. 3 is described in greater detail in U.S. Pat. Nos. 5,159,594 and 5,386,466. These patents are hereby incorporated by reference. Information transmitted by local angel 303 to and from network processor 202 and LAN interface 211 is handled in the same manner as described in the two incorporated patents. Information from SAKI interface 212 is assembled into a message by local angel 303 and transmitted to wireless manager 301 via software layer 310 through 315. Local angel 303 is illustrated as a separate processor but as described in the incorporated patents is a software process that is implemented within switch processor 201. Wireless manager 301 controls the implementation of operations with respect to the wireless sets. Connection manager 302 controls the connections of the internal network of PCS switch 111.

Figure 4:
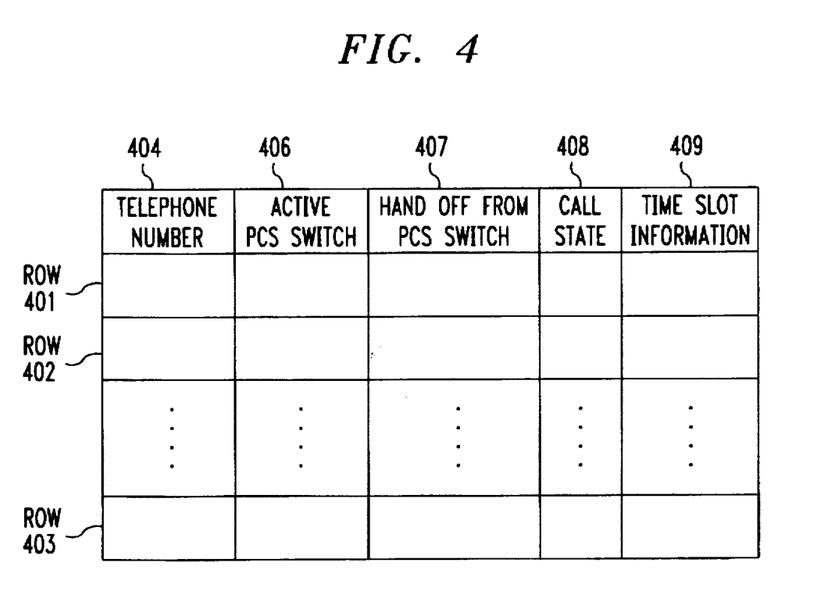
FIGS. 4 and 5 illustrate tables utilized by the switch processors of the PCS switches of FIG. 1.
Figure 5:
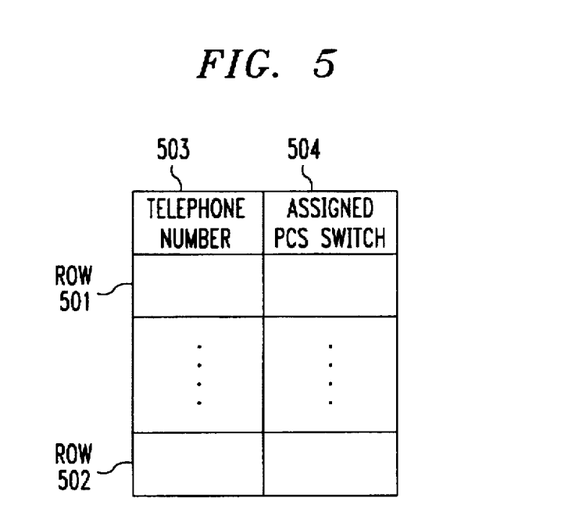

FIG. 4 illustrates an activity table utilized by the assigned PCS switch to determine for the telephone numbers assigned to that PCS switch the following information. Column 404 defines the assigned telephone numbers. Column 406 defines which PCS switch is the active PCS switch for a particular telephone number, column 407 designates the PCS switch from which a handoff has occurred, column 408 gives the present call state of the wireless set assigned to the telephone number, and column 409 designates which receive and transmit timeslots are to be utilized by a PCS switch to communication with TDM bus 103 of FIG. 1.

FIG. 5 is the assignment table. Each PCS switch maintains a table such as FIG. 5 which defines for each telephone number to which PCS switch that telephone number is assigned.

FIGS. 6 through 9 illustrate in greater detail the operations performed by the switch processors. Decision block 601 determines if a message from a wireless set, that has established communication with a base station of the executing PCS switch, has transmitted a message to the PCS switch via the base station. If the answer is yes, decision block 602 determines if the message is a call origination setup message. This type of setup message means that the wireless set is initiating a new call. If the answer is no, decision block 603 determines if the message is a call handoff setup message. If the answer is yes, control is transferred to decision block 604 which determines if the wireless set is assigned to this PCS switch. The assigned PCS switch is the switch that control computer 101 of FIG. 1 believes that the wireless set is connected to as a wired station set. If the decision in decision block 604 is no, control is transferred to block 901 of FIG. 9. If the answer in decision block 604 is yes, block 605 transmits a "send handoff to another PCS switch" relay message to the present active PCS switch. The currently active PCS switch is responsive to this message to cease communicating audio information to switching system 100. The currently assigned PCS switch does this by removing the talk path through itself. Block 606 then sets up a talk path through the executing switch and commences to communicate information with TDM bus 103 of FIG. 1. Block 607 marks the executing PCS switch as the present active PCS switch and transfers control back to decision block 601.

Figure 6:
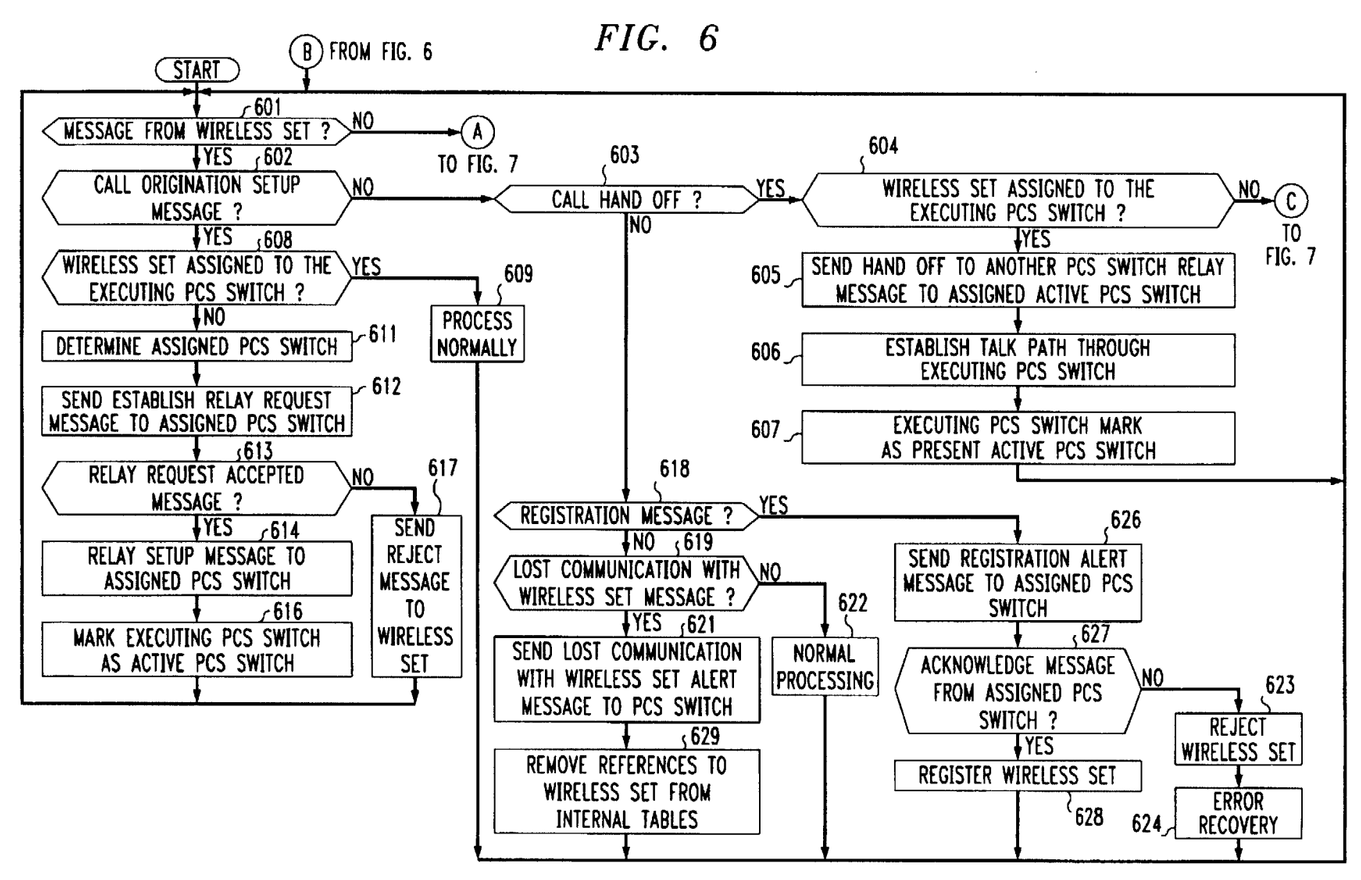
FIGS. 6 through 9 illustrate in greater detail the operations performed by the switch processor.

Returning to decision block 602, if the answer is yes, control is transferred to decision block 608. The latter decision block determines if the wireless set is assigned to the executing PCS switch. If the answer is yes, block 609 processes the call origination in the normal manner before returning control to decision block 601. If the answer in decision block 608 is no, block 611 determines the assigned PCS switch of the wireless set, and block 612 sends an "establish relay request" message to the assigned PCS switch. The "establish relay request" message sets up a messaging path which allows the assigned PCS switch to communicate messages between the present executing PCS switch and control computer 101 of FIG. 1. Decision block 613 then determines if a "relay request accepted" message is received back from the assigned PCS switch. If the answer is no, block 617 sends a reject message to the wireless set. If the answer in decision block 613 is yes, block 614 relays the setup message to the assigned PCS switch which relays it to control processor 101, and block 616 marks the executing PCS switch as the active PCS switch.

Returning to decision block 603, if the answer is no, control is transferred to decision block 618. The latter decision block determines if a registration message was received from the wireless set. If the answer is no, decision block 619 determines if a "lost communication with wireless set" message was received from the base station. If the answer is yes, block 621 sends a "lost communication with wireless set alert" message to the assigned PCS switch. Block 629 removes all references to the wireless set from internal tables of the executing PCS switch. If the answer in decision block 619 is no, 622 performs normal processing.

Returning to decision block 618, if the answer is yes, control is transferred to 626 which sends a registration alert message to the assigned PCS switch. Decision block 627 determines if an "acknowledge message to the registration alert" message was received from the assigned PCS switch. If the answer is yes, block 628 registers the wireless set. If the answer in decision block 627 is no, block 623 transmits a reject message to the wireless set, and block 624 performs error recovery.

Figure 7:
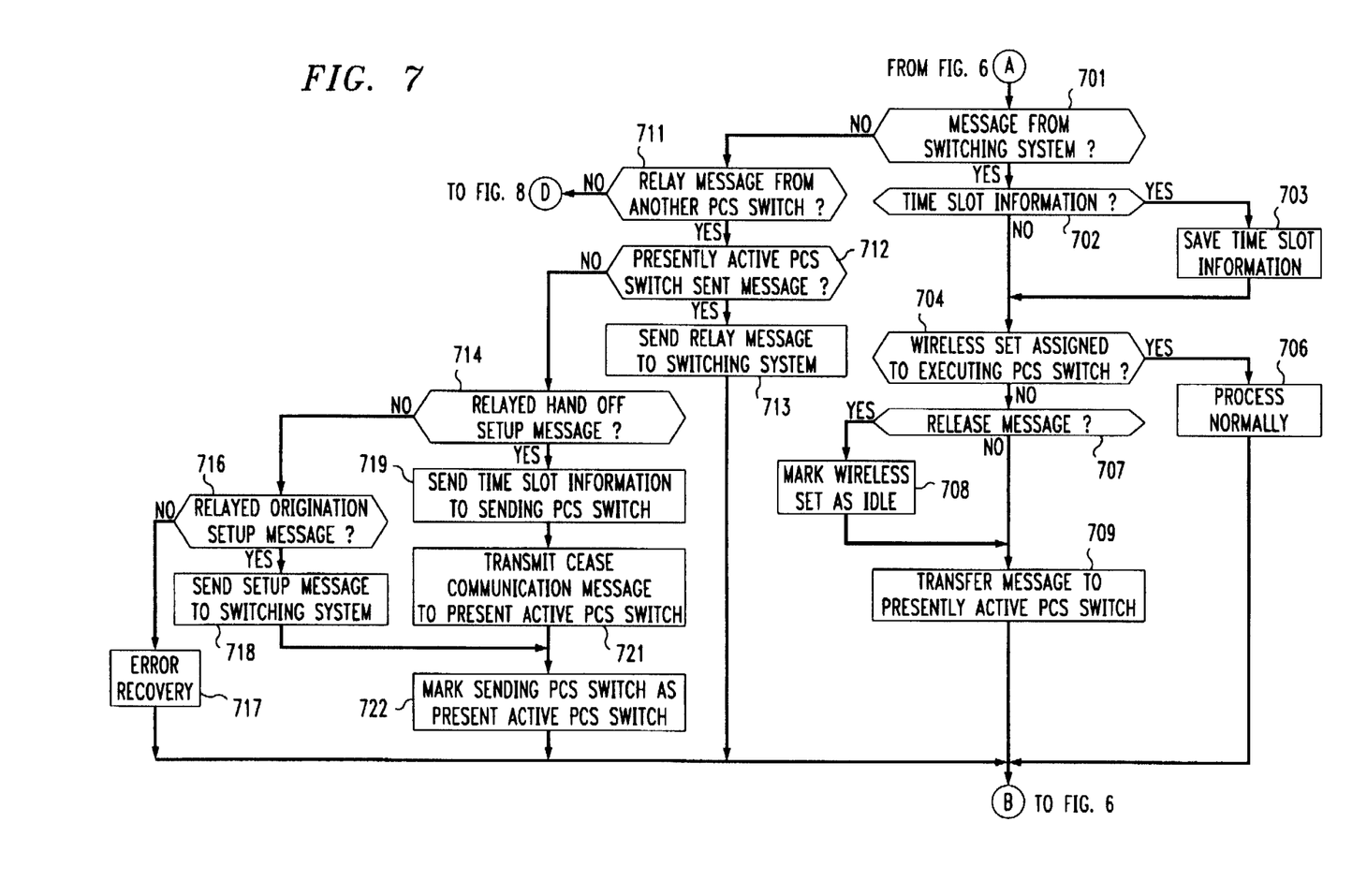

Returning to decision block 601, if the answer is no, control is transferred to decision block 701 of FIG. 7. Decision block 701 determines if the message is from switching system 100. If the answer is yes, decision block 702 determines if it is timeslot information. If the answer is yes, block 703 stores the timeslot information in the assigned PCS switch which in this case is also the executing PC switch. Control is transferred to decision block 704 which determines if the wireless set is assigned to the executing PCS switch. If the answer is yes, block 706 processes the message in the normal manner. If the answer in decision block 704 is no, decision block 707 determines if a release message has been received from switching system 100. If the answer is yes, block 708 marks the wireless set as idle and transfers control to block 709. The latter block transfers the received message to the presently active PCS switch as a relay message. Finally, block 709 returns control to decision block 601 of FIG. 6.

Returning to decision block 701 of FIG. 7, if the answer is no, control is transferred to decision block 711. The latter decision block determines if a relay message from another PC switch has been received. If the answer is no, control is transferred to decision block 801 of FIG. 8. If the answer in decision block 711 is yes, decision block 712 determines if the presently active PCS switch sent the message. If the answer is yes, block 713 sends the relay message to control processor 101 as if that message originated from the assigned PCS switch. If the answer in decision block 712 is no, decision block 714 determines if the relayed message is a handoff setup message. If the answer is yes, block 719 sends the timeslot information for the wireless set the sending PCS switch. Further, block 721 transmits a cease communication message to the present active PCS switch. Block 722 marks the sending PCS switch as the present active PCS switch before returning control to decision block 601 of FIG. 6. If the answer in decision block 714 is no, decision block 716 determines if the relayed message is an origination setup message. If the answer is yes, block 718 transmits a setup message to switching system 100 before transferring control to block 722. If the answer in decision block 716 is no, block 717 does error recovery before transferring control to decision block 601 of FIG. 6.

Figure 8:
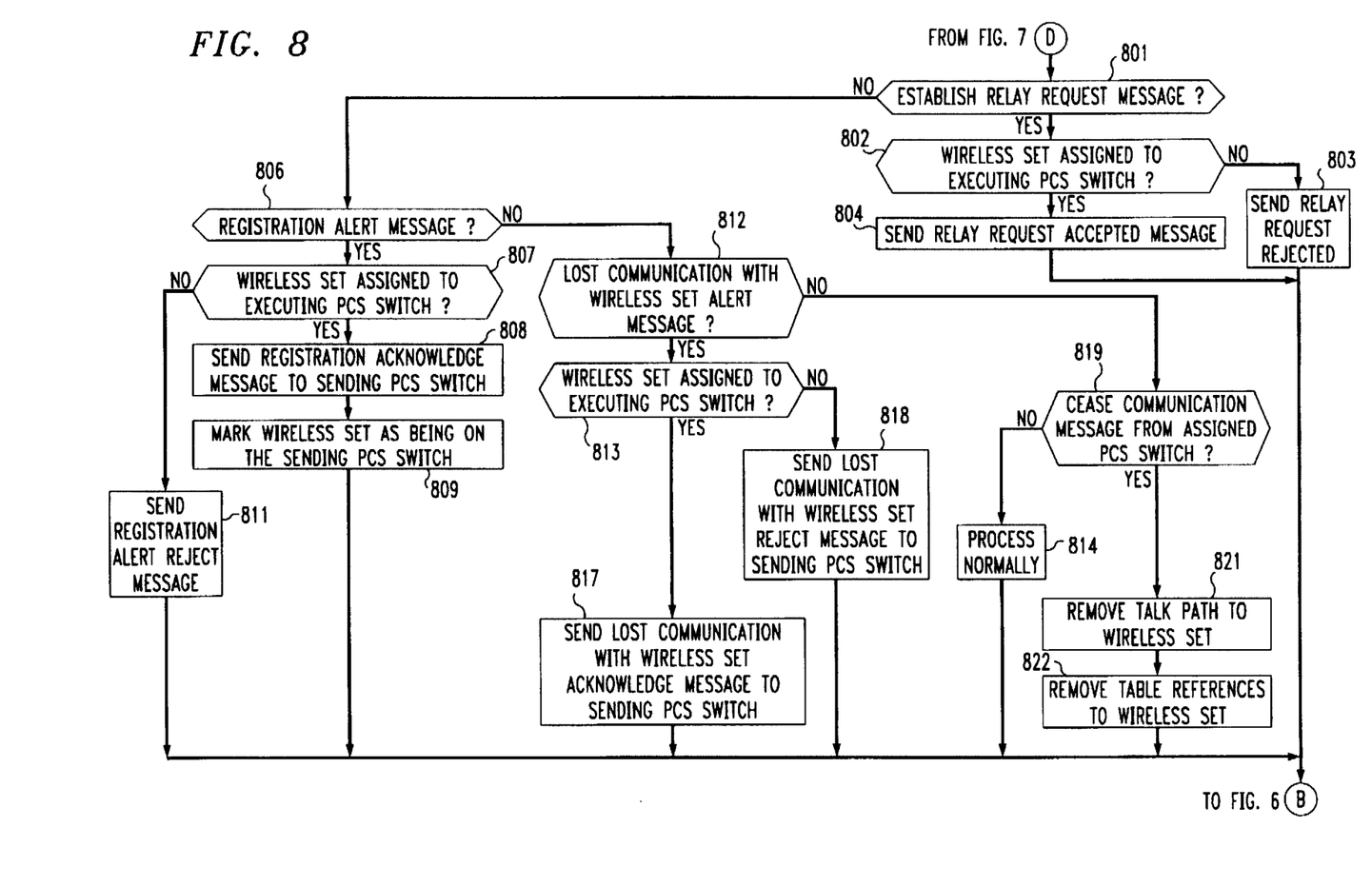

Returning to decision block 711 of FIG. 7, if the answer is no, control is transferred to decision block 801 of FIG. 8. Decision block 801 determines if an "establish relay request" message has been received. If the answer is yes, decision block 802 determines if the wireless set that is the subject of the "establish relay request" message is assigned to the executing PCS switch. If the answer is no, block 803 sends a "relay request rejected" message to the sending PCS switch before transferring control back to decision block 601 of FIG. 6. If the answer in decision block 802 is yes, block 804 sends a "relay request accepted" message.

Returning to decision block 801, if the answer is no, decision block 806 determines if a "registration alert" message has been received. This message is transmitted by a PCS switch to the assigned PCS switch when a wireless set registers. If the answer in decision block 806 is yes, decision block 807 determines if the wireless set is assigned to the executing PCS switch. If the answer is no, block 811 sends a "registration alert reject" message back to the sending PCS switch. If the answer in decision block 807 is yes, block 808 sends a "registration acknowledge" message to the sending PCS switch, and block 809 marks the wireless set as being on the sending PCS switch in the table illustrated in FIG. 4.

Returning to decision block 806, if the answer is no, control is transferred to decision block 812 which determines if the received message was a "lost communication with wireless set alert" message. If the answer is yes, decision block 816 determines if the wireless set is assigned the executing PCS switch. If the answer is no, control is transferred to block 818 which sends a "lost communication with wireless set reject" message to the sending PCS switch. If the answer in decision block 816 is yes, block 817 sends a "lost communication with wireless set acknowledge" message to sending PCS switch. Returning to decision block 812, if the answer is no, decision block 819 determines if the message was a "cease communication" message from the assigned PCS switch. This message is transmitted during a handoff from the present executing PCS switch to another PCS switch. If the answer is no in decision block 819, block 814 processes any other message in a normal manner. If the answer in decision block 819 is yes, block 821 removes the talk path through the executing PCS switch, and block 822 removes all references to the wireless set in the table illustrated in FIG. 4.

Figure 9:
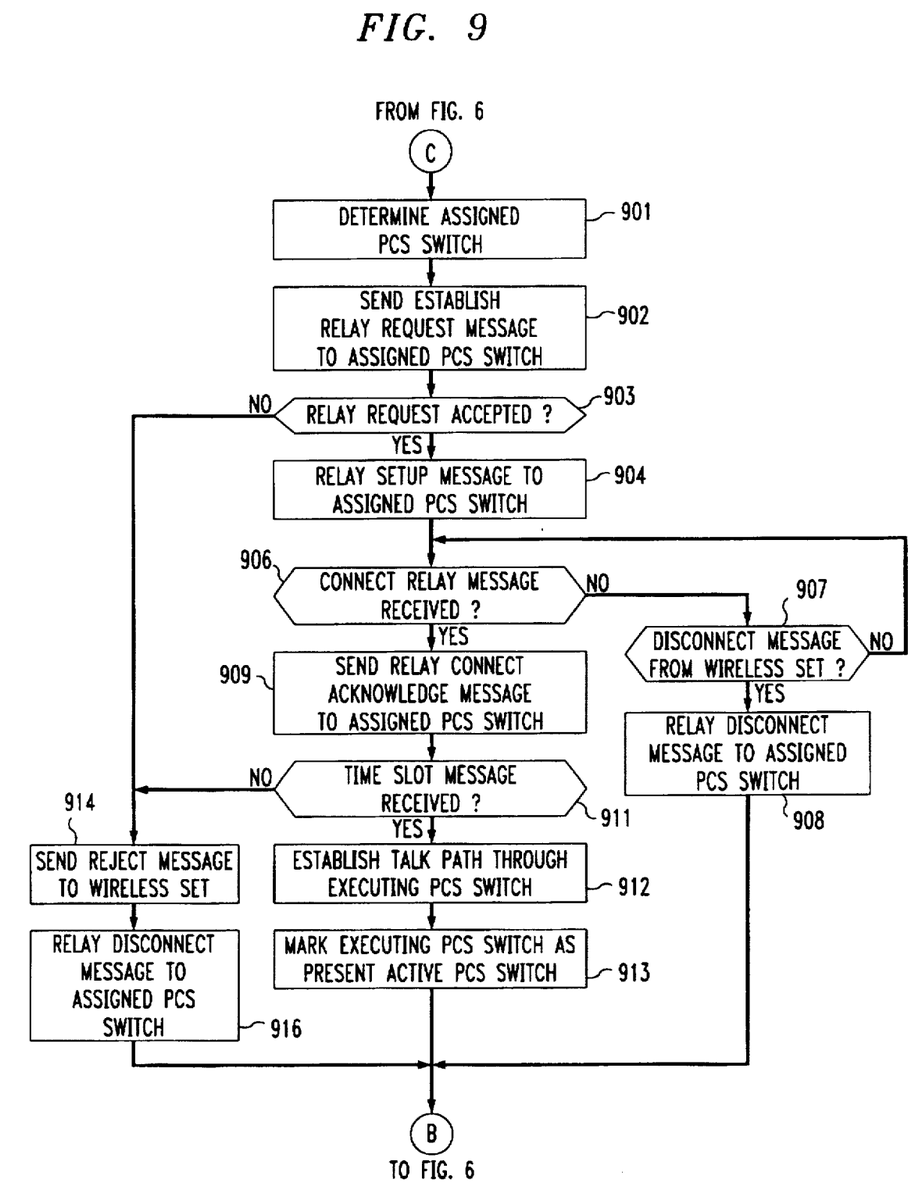

Returning to decision block 604 of FIG. 6, if the answer is no, control is transferred to block 901 of FIG. 9. The transfer to block 901 of FIG. 9 from decision block 604 means that a call handoff setup message was received for a wireless set not assigned to the executing PCS switch. When this occurs, the executing PCS switch must go to the assigned PCS switch to obtain the timeslot information and to cause the assigned PCS switch to idle the PCS switch from which the handoff is occurring. Block 901 determines the assigned PCS switch for the wireless set from the table illustrated in FIG. 5. Block 901 sends a "establish relay request" message to the assigned PCS switch. Decision block 903 determines if the "establish relay request" message was accepted by the assigned PCS switch. If the answer is yes, block 904 relays the setup message received from the wireless set to the assigned PCS switch for transmission to control processor 101 of FIG. 1. Decision blocks 906 and 907 await either the reception of a connect message from the assigned PCS switch or a disconnect message from the wireless set. If a disconnect message is determined by decision block 907, block 908 transmits a "disconnect relay" message to the assigned PCS switch which will send a disconnect message to control processor 101 of FIG. 1 ending the call origination attempt. If a "connect relay" message is received, decision block 907 transfers control to block 909 which sends a "connect acknowledge relay" message to the assigned PCS switch for transmission to control processor 101. Decision block 911 determines if a timeslot message is received from the assigned PCS switch. If the answer is no, block 914 sends a reject message to the wireless set, and block 916 sends a "disconnect relay" message to the assigned PCS switch. If the answer in decision block 911 is yes, block 912 establishes a talk path through the executing PCS switch, and block 913 marks the executing PCS switch as the present active PCS switch before transferring control back to decision block 901 of FIG. 6. If the answer in decision block 903 was no, blocks 914 and 916 are executed whose operations have already been discussed.

It is to be understood that the above-described embodiment is merely illustrative of the principles of the invention and that other arrangements may be devised by those skilled in the art without departing from the spirit or scope of the invention. In particular, it would be obvious to one skilled in the art that one PCS switch could be designated as the master PCS switch and that all messages could be relayed through the master PCS switch.

The invention claimed is:

1. A first wireless switch for use as an integral part of a telecommunication switching system for providing service to assigned wireless telephones via a first set of base stations and the telecommunication switching system having a control processor for controlling operation of the telecommunication switching system and a communication medium connected to the control processor over which the control processor communicates control information with telephone interfaces circuits to which telephone sets are connected via telephone links, comprising:

interface links connected to the first set of the plurality of base stations;

an interface circuit connected directly to the communication medium;

a controller for providing telecommunication service to the assigned wireless telephones by communicating with the control processor exclusively via the medium and interface circuit, the controller emulating an interface circuit in its connection to the medium and emulating a telephone set in its communications with the control processor;

the controller responsive to a first control message for an incoming call received from the control processor for one of the assigned wireless telephones with the one of the assigned wireless telephones registered on one of a second set of base stations connected to a second wireless switch for communicating the first control message to the second wireless switch via the communication medium and the interface circuit; and the controller further responsive to a second control message for the incoming call received from the second wireless switch via communication medium and the interface circuit for communicating the second control message to the control processor.

2. The first wireless switch of claim 1 wherein the controller further responsive to a third message received via the communication medium from a third wireless switch indicating that the one of the assigned wireless telephones is now communicating on the incoming call via the third wireless switch for communicating all control message relating to the incoming call received from the control processor to the third wireless switch.

3. The first wireless switch of claim 2 wherein the controller further responsive to the third message for transmitting a fourth control message to the second wireless switch.

4. The first wireless switch of claim 3 wherein the second wireless switch responsive to the fourth control message for abandoning the call.

5. A telecommunication switching system for providing service to a plurality of wireless telephones and telephone sets and the telecommunication switching system having a control processor for controlling operation of the telecommunication switching system and a communication medium connected to the control processor over which the control processor communicates control information with telephone interfaces circuits to which the telephone sets are connected via telephone links, comprising:

a plurality of wireless switches that are an integral part of the telecommunication switching system;

a set of the plurality of wireless telephones assigned to each of the plurality of wireless switches by the telecommunication switching system;

an individual interface circuit for directly connecting each of the plurality of wireless switches to the communication medium;

a controller in each of the plurality of wireless switches for providing telecommunication service to the plurality of wireless telephones by communicating with the control processor exclusively via the communication medium, each of the plurality of wireless switches emulating a telephone interface circuit in its connection to the communication medium and emulating a telephone set in its communications with the control processor;

the controller in a first one of the plurality of wireless switches responsive to a first control message for an incoming call received from the control processor, for a first one of a first set of the plurality of wireless telephones assigned to the first one of the plurality of wireless switches with the first one of the first set of the plurality of wireless telephones registered on a first one of a first set of base stations connected to a second one of the plurality of wireless switches, for communicating the first control message to the second one of the plurality of wireless switches via the communication medium and interface circuit; and the controller of the first one of the plurality of wireless switches further responsive to a second control message for the incoming call received from the second one of the plurality of wireless switches via communication medium and interface circuit for communicating the second control message to the control processor.

6. The telecommunication switching system of claim 5 wherein the controller of the first one of the plurality of wireless switches further responsive to a third control message received via the communication medium and the interface circuit from a third one of the plurality of wireless switches for communicating all control message relating to the call received from the control processor to the third one of the plurality of wireless switches whereby the third control message indicating that the first one of the first set of the plurality of wireless telephones is now communicating on the incoming call via the third one of the plurality of wireless switches.

7. The telecommunication switching system of claim 6 wherein the controller of the first one of the plurality of wireless switches further responsive to the third control message for transmitting a fourth control message to the second one of plurality of wireless switches.

8. The telecommunication switching system of claim 7 wherein the second one of plurality of wireless switches responsive to the fourth control message for abandoning the call.

9. A method for controlling a first wireless switch used as an integral part of a telecommunication switching system to provide service to assigned wireless telephones via a first set of base stations and the telecommunication switching system having a control processor for controlling operation of the telecommunication switching system and a communication medium connected to the control processor over which the control processor communicates control information with telephone interfaces circuits to which telephone sets are connected via telephone links, the first wireless switch having interface links connected to a first set of the plurality of base stations, a controller, and an interface circuit connected directly to the communication medium, the method comprising the steps:

providing telecommunication service by the controller to the assigned wireless telephones by communicating with the control processor exclusively via the medium and interface circuit, emulating by the controller an interface circuit in its connection to the medium and emulating by the controller a telephone set in its communications with the control processor;

communicating a first control message to the second wireless switch via the communication medium and the interface circuit by the controller in response to the first control message for an incoming call received from the control processor for one of the assigned wireless telephones with the one of the assigned wireless telephones registered on one of a second set of base stations connected to a second wireless switch; and communicating a second control message to the control processor by the controller in response to the second control message for the incoming call received from the second wireless switch via communication medium and the interface circuit.

10. The method of claim 9 further comprises the step of communicating all control message relating to the incoming call received from the control processor to a third wireless switch by the controller in response to a third message received via the communication medium from the third wireless switch indicating that the one of the assigned wireless telephones is now communicating on the incoming call via the third wireless switch.

11. The method of claim 10 further comprises the step of transmitting a fourth control message to the second wireless switch by the controller in response to the third message.

12. The method of claim 11 further comprises the step of abandoning the call by the second wireless switch response to the fourth control message.

13. A method of controlling a telecommunication switching system to provide service to a plurality of wireless telephones and telephone sets and the telecommunication switching system having a control processor for controlling operation of the telecommunication switching system, a communication medium connected to the control processor over which the control processor communicates control information with telephone interfaces circuits to which the telephone sets are connected via telephone links, a plurality of wireless switches that are an integral part of the telecommunication switching system, and a set of the plurality of wireless telephones assigned to each of the plurality of wireless switches by the telecommunication switching system, and each of the plurality of wireless switches having an individual interface circuit for directly connecting each of the plurality of wireless switches to the communication medium, the method comprising the steps of:

emulating a telephone interface circuit in its connection to the communication medium and emulating a telephone set in its communications with the control processor by a controller in each of the plurality of wireless switches to provided telecommunication service to the plurality of wireless telephones by communicating with the control processor exclusively via the communication medium;

communicating a first control message to a second one of the plurality of wireless switches via the communication medium and interface circuit by the controller in a first one of the plurality of wireless switches in response to the first control message for an incoming call received from the control processor for a first one of a first set of the plurality of wireless telephones assigned to the first one of the plurality of wireless switches with the first one of the first set of the plurality of wireless telephones registered on a first one of a first set of base stations connected to the second one of the plurality of wireless switches; and communicating a second control message to the control processor by the controller of the first one of the plurality of wireless switches in response to the second control message for the incoming call received from the second one of the plurality of wireless switches via communication medium and interface circuit.

14. The method of claim 13 further comprises the step of communicating all control message relating to the call received from the control processor to a third one of the plurality of wireless switches by the controller of the first one of the plurality of wireless switches in response to a third control message received via the communication medium and the interface circuit from the third one of the plurality of wireless switches whereby the third control message indicating that the first one of the first set of the plurality of wireless telephones is now communicating on the incoming call via the third one of the plurality of wireless switches.

15. The method of claim 14 further comprises the step of transmitting a fourth control message to the second one of plurality of wireless switches by the controller of the first one of the plurality of wireless switches in response to the third control message.

16. The method of claim 15 further comprises the step of abandoning the call by the second one of plurality of wireless switches in response to the fourth control message.

* * * * *